United States Patent
Asano

(10) Patent No.: US 11,404,695 B2
(45) Date of Patent: Aug. 2, 2022

(54) BINDER COMPOSITION FOR ELECTROCHEMICAL DEVICE ELECTRODE, COMPOSITION FOR ELECTROCHEMICAL DEVICE ELECTRODE, ELECTRODE FOR ELECTROCHEMICAL DEVICE, AND ELECTROCHEMICAL DEVICE

(71) Applicant: ZEON CORPORATION, Tokyo (JP)

(72) Inventor: Junichi Asano, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 232 days.

(21) Appl. No.: 16/617,671

(22) PCT Filed: Jun. 14, 2018

(86) PCT No.: PCT/JP2018/022782
§ 371 (c)(1),
(2) Date: Nov. 27, 2019

(87) PCT Pub. No.: WO2018/235722
PCT Pub. Date: Dec. 27, 2018

(65) Prior Publication Data
US 2020/0185724 A1 Jun. 11, 2020

(30) Foreign Application Priority Data
Jun. 19, 2017 (JP) .............................. JP2017-119380

(51) Int. Cl.
| | | |
|---|---|---|
| *H01M 4/62* | (2006.01) | |
| *H01G 11/38* | (2013.01) | |
| *H01M 4/66* | (2006.01) | |
| *H01M 10/0525* | (2010.01) | |
| *H01M 4/1391* | (2010.01) | |
| *H01M 4/131* | (2010.01) | |
| *H01M 4/137* | (2010.01) | |
| *H01G 11/50* | (2013.01) | |
| *H01M 4/136* | (2010.01) | |
| *H01M 4/13* | (2010.01) | |
| *H01M 4/1397* | (2010.01) | |
| *H01M 4/139* | (2010.01) | |
| *H01M 4/04* | (2006.01) | |

(52) U.S. Cl.
CPC ............ *H01M 4/622* (2013.01); *H01G 11/38* (2013.01); *H01G 11/50* (2013.01); *H01M 4/13* (2013.01); *H01M 4/131* (2013.01); *H01M 4/136* (2013.01); *H01M 4/137* (2013.01); *H01M 4/1391* (2013.01); *H01M 4/1397* (2013.01); *H01M 4/621* (2013.01); *H01M 4/666* (2013.01); *H01M 10/0525* (2013.01); *H01M 4/0404* (2013.01); *H01M 4/139* (2013.01); *Y02E 60/10* (2013.01)

(58) Field of Classification Search
None
See application file for complete search history.

(56) References Cited

U.S. PATENT DOCUMENTS

| | | | | |
|---|---|---|---|---|
| 2006/0275661 A1* | 12/2006 | Kim | ....................... | H01M 4/622 429/217 |
| 2009/0297948 A1* | 12/2009 | Dahn | .................... | H01M 4/523 429/220 |
| 2014/0315095 A1* | 10/2014 | Honkawa | ................ | H01M 4/13 429/245 |
| 2016/0013465 A1* | 1/2016 | Akiike | ................ | H01M 50/403 429/144 |
| 2016/0013481 A1 | 1/2016 | Jeong et al. | | |

FOREIGN PATENT DOCUMENTS

| | | |
|---|---|---|
| CN | 101180755 A | 5/2008 |
| CN | 105027325 A | 11/2015 |
| JP | 2008546135 A | 12/2008 |
| JP | 2011513911 A | 4/2011 |
| JP | 2012204303 A | 10/2012 |
| WO | 2014148577 A1 | 9/2014 |

OTHER PUBLICATIONS

Feb. 3, 2021, the Extended European Search Report issued by the European Patent Office in the corresponding European Patent Application No. 18820493.7.
S. O. Ilyin et al., Viscosity of Polyacrylonitrile Solutions: The Effect of the Molecular Weight, Polymer Science Series A, 2015, pp. 494-500, vol. 57, No. 4.
Dec. 31, 2019, International Preliminary Report on Patentability issued in the International Patent Application No. PCT/JP2018/022782.

* cited by examiner

*Primary Examiner* — Katie L. Hammer
(74) *Attorney, Agent, or Firm* — Kenja IP Law PC

(57) ABSTRACT

A binder composition contains a water-soluble polymer and water. The water-soluble polymer includes a nitrile group-containing monomer unit and an ethylenically unsaturated carboxylic acid monomer unit, and has a weight-average molecular weight of not less than 1,000 and not more than 50,000.

10 Claims, No Drawings

BINDER COMPOSITION FOR ELECTROCHEMICAL DEVICE ELECTRODE, COMPOSITION FOR ELECTROCHEMICAL DEVICE ELECTRODE, ELECTRODE FOR ELECTROCHEMICAL DEVICE, AND ELECTROCHEMICAL DEVICE

TECHNICAL FIELD

The present disclosure relates to a binder composition for an electrochemical device electrode, a composition for an electrochemical device electrode, an electrode for an electrochemical device, and an electrochemical device.

BACKGROUND

Electrochemical devices such as lithium ion secondary batteries and electric double-layer capacitors have characteristics such as compact size, light weight, high energy-density, and the ability to be repeatedly charged and discharged, and are used in a wide variety of applications.

An electrode for a lithium ion secondary battery, for example, generally includes a current collector and an electrode mixed material layer (positive electrode mixed material layer or negative electrode mixed material layer) formed on the current collector. This electrode mixed material layer is formed by, for example, applying a slurry composition containing an electrode active material, a binder-containing binder composition, and so forth onto the current collector, and then drying the applied slurry composition.

In recent years, attempts have been made to improve binder compositions used in the formation of electrode mixed material layers with the aim of achieving even better electrochemical device performance.

In one specific example, a negative electrode material composition for a lithium secondary battery containing a binder that is a polyacrylonitrile-acrylic acid copolymer having a molecular weight within a range of 100,000 to 5,000,000 has been proposed (for example, refer to Patent Literature (PTL) 1). As a result of the negative electrode material composition for a lithium secondary battery in PTL 1 containing a binder that has a comparatively high molecular weight as described above, the composition has high binding strength and can improve electrolyte solution resistance of a negative electrode formed therewith. This leads to high capacity and good life characteristics of a lithium secondary battery including a negative electrode that is formed using the negative electrode material composition for a lithium secondary battery described in PTL 1.

CITATION LIST

Patent Literature

PTL 1: JP 2011-513911 A

SUMMARY

Technical Problem

In recent years, there has been demand for a binder composition for an electrochemical device electrode to, in a situation in which a composition for an electrochemical device electrode is produced through compounding of an electrode active material, enable good dispersion of solid content contained in the composition for an electrode, such as the electrode active material, and to also enable improvement of voltage resistance of an electrode that is obtained.

However, with the composition containing a binder having a comparatively high molecular weight that is proposed in PTL 1, it has not been possible to achieve a balance of sufficiently high levels of increasing the degree of dispersion of solid content in the composition and increasing flexibility and voltage resistance of an electrode obtained using the composition.

In other words, the conventional technique described above leaves room for improvement in terms of increasing solid content dispersing ability through a binder composition for an electrochemical device electrode and increasing flexibility and voltage resistance characteristics of an obtained electrode.

Accordingly, an objective of the present disclosure is to provide a binder composition for an electrochemical device electrode that has excellent solid content dispersing ability and that can form an electrode for an electrochemical device having high flexibility and voltage resistance characteristics.

Another objective of the present disclosure is to provide a composition for an electrochemical device electrode that has a high degree of dispersion of solid content and that can form an electrode for an electrochemical device having high flexibility and voltage resistance characteristics.

Yet another objective of the present disclosure is to provide an electrode for an electrochemical device having high flexibility and voltage resistance characteristics, and also an electrochemical device that includes this electrode.

Solution to Problem

The inventor conducted diligent investigation with the aim of solving the problems set forth above. The inventor made a new discovery that by compounding, in a binder composition for an electrochemical device electrode, a water-soluble polymer that has a comparatively low weight-average molecular weight and that includes a nitrile group-containing monomer unit and an ethylenically unsaturated carboxylic acid monomer unit, solid content dispersing ability of the binder composition for an electrochemical device electrode (hereinafter, also referred to simply as a "binder composition") can be improved, and flexibility and voltage resistance characteristics of an obtained electrode for an electrochemical device (hereinafter, also referred to simply as an "electrode") can be increased, and in this manner completed the present disclosure.

Specifically, the present disclosure aims to advantageously solve the problems set forth above by disclosing a binder composition for an electrochemical device electrode comprising a water-soluble polymer and water, wherein the water-soluble polymer includes a nitrile group-containing monomer unit and an ethylenically unsaturated carboxylic acid monomer unit, and the water-soluble polymer has a weight-average molecular weight of not less than 1,000 and not more than 50,000. Compounding of a water-soluble polymer that includes a nitrile group-containing monomer unit and an ethylenically unsaturated carboxylic acid monomer unit, and that has a weight-average molecular weight of not less than 1,000 and not more than 50,000 as set forth above can increase solid content dispersing ability of a binder composition and improve flexibility and voltage resistance characteristics of an obtained electrode.

The term "water-soluble polymer" as used in the present disclosure refers to a polymer for which insoluble content is less than 1.0 mass % when 0.5 g of the polymer is dissolved in 100 g of water at a temperature of 25° C. Moreover, the phrase "includes a monomer unit" as used with respect to a polymer in the present disclosure means that "a polymer obtained with the monomer includes a structural unit (repeating unit) derived from the monomer". Furthermore, the "weight-average molecular weight" of a "water-soluble polymer" referred to in the present disclosure is the polyethylene oxide-equivalent weight-average molecular weight measured by gel permeation chromatography using 0.1 M $NaNO_3$ aqueous solution as an eluent.

In the presently disclosed binder composition for an electrochemical device electrode, fractional content of the nitrile group-containing monomer unit in the water-soluble polymer is preferably not less than 20 mass % and not more than 80 mass %. When the fractional content of the nitrile group-containing monomer unit is within the range set forth above, solid content dispersing ability of the binder composition can be further increased, and flexibility of an obtained electrode can be further improved.

In the presently disclosed binder composition for an electrochemical device electrode, fractional content of the ethylenically unsaturated carboxylic acid monomer unit in the water-soluble polymer is preferably not less than 20 mass % and not more than 80 mass %. When the fractional content of the ethylenically unsaturated carboxylic acid monomer unit is within the range set forth above, solid content dispersing ability of the binder composition can be further increased, and an electrode capable of enhancing output characteristics of an electrochemical device can be formed using the binder composition.

In the presently disclosed binder composition for an electrochemical device electrode, the nitrile group-containing monomer unit is preferably a (meth)acrylonitrile unit. When the water-soluble polymer contained in the binder composition includes a (meth)acrylonitrile unit, a composition for an electrochemical device electrode having even better dispersibility of electrode active material can be produced.

In the present disclosure, "(meth)acrylonitrile" is used to indicate "acrylonitrile" and/or "methacrylonitrile".

In the presently disclosed binder composition for an electrochemical device electrode, the ethylenically unsaturated carboxylic acid monomer unit is preferably an ethylenically unsaturated dicarboxylic acid monomer unit. The inclusion of an ethylenically unsaturated dicarboxylic acid monomer unit in the water-soluble polymer contained in the binder composition can further increase solid content dispersing ability of the binder composition.

The presently disclosed binder composition for an electrochemical device electrode preferably further comprises a particulate polymer. The inclusion of a particulate polymer in the binder composition can improve life characteristics of an obtained electrode.

In the presently disclosed binder composition for an electrochemical device electrode, fractional content of the water-soluble polymer is preferably not less than 1 mass % and not more than 20 mass % relative to 100 mass % of the particulate polymer. When a ratio of the particulate polymer and the water-soluble polymer in the binder composition is within the range set forth above, solid content dispersing ability of the binder composition can be further improved, and an electrode capable of further enhancing output characteristics of an electrochemical device can be formed using the binder composition.

Moreover, the present disclosure aims to advantageously solve the problems set forth above by disclosing a composition for an electrochemical device electrode comprising: any one of the binder compositions for an electrochemical device electrode set forth above; and an electrode active material. A composition for an electrochemical device electrode that contains an electrode active material and any one of the binder compositions set forth above has a high degree of dispersion of solid content and can form an electrode for an electrochemical device having high flexibility and voltage resistance characteristics.

Furthermore, the present disclosure aims to advantageously solve the problems set forth above by disclosing an electrode for an electrochemical device comprising: a current collector; and an electrode mixed material layer formed using the composition for an electrochemical device electrode set forth above. An electrode for an electrochemical device that includes an electrode mixed material layer formed using the composition for an electrochemical device electrode set forth above has excellent flexibility and voltage resistance characteristics.

Also, the present disclosure aims to advantageously solve the problems set forth above by disclosing an electrochemical device comprising the electrode for an electrochemical device set forth above. An electrochemical device including the electrode for an electrochemical device set forth above has excellent electrochemical characteristics such as output characteristics.

Advantageous Effect

According to the present disclosure, it is possible to provide a binder composition for an electrochemical device electrode that has excellent solid content dispersing ability and can form an electrode for an electrochemical device having high flexibility and voltage resistance characteristics.

Moreover, according to the present disclosure, it is possible to provide a composition for an electrochemical device electrode that has a high degree of dispersion of solid content and can form an electrode for an electrochemical device having high flexibility and voltage resistance characteristics.

Furthermore, according to the present disclosure, it is possible to provide an electrode for an electrochemical device having high flexibility and voltage resistance characteristics, and also an electrochemical device that includes this electrode.

DETAILED DESCRIPTION

The following provides a detailed description of embodiments of the present disclosure.

The presently disclosed binder composition for an electrochemical device electrode can be used as a material in production of a composition for an electrochemical device electrode. Moreover, the presently disclosed composition for an electrochemical device electrode is produced using the presently disclosed binder composition for an electrochemical device electrode and an electrode active material. Furthermore, the presently disclosed electrode for an electrochemical device includes a current collector and an electrode mixed material layer formed using the presently disclosed composition for an electrochemical device electrode. Also, the presently disclosed electrochemical device includes at least the presently disclosed electrode for an electrochemical device.

(Binder Composition for Electrochemical Device Electrode)

The presently disclosed binder composition for an electrochemical device electrode is a composition that contains a water-soluble polymer and water serving as a solvent, and that may optionally further contain other components. A feature of the presently disclosed binder composition for an electrochemical device electrode is that a polymer including a nitrile group-containing monomer unit and an ethylenically unsaturated carboxylic acid monomer unit, and having a weight-average molecular weight of not less than 1,000 and not more than 50,000 is used as the water-soluble polymer.

By using the presently disclosed binder composition for an electrochemical device electrode in production of a composition for an electrochemical device electrode, the degree of dispersion of solid content in the composition for an electrochemical device electrode can be increased. Moreover, an electrode for an electrochemical device having high flexibility and voltage resistance characteristics can be obtained by using a composition for an electrochemical device electrode that contains the presently disclosed binder composition for an electrochemical device electrode.

Although it is not clear why the effects described above are obtained by using the presently disclosed binder composition, the reasons for this are presumed to be as follows.

The water-soluble polymer contained in the presently disclosed binder composition displays hydrophilicity and good dispersion in water as a result of including an ethylenically unsaturated carboxylic acid monomer unit, and can be interposed well between electrode active material so as to inhibit aggregation of the electrode active material as a result of having a molecular weight of not less than 1,000 and not more than 50,000. As a consequence, dispersibility of electrode active material in a composition for an electrochemical device electrode can be increased. The water-soluble polymer can also improve flexibility of an obtained electrode as a result of having a molecular weight of 50,000 or less and including a nitrile group-containing monomer unit.

Moreover, through the water-soluble polymer being interposed well between electrode active material, good covering of the electrode active material can be achieved in an electrode obtained when the presently disclosed composition for an electrochemical device electrode is used in electrode formation. Good covering of the electrode active material by the water-soluble polymer in an electrode can protect the electrode active material from damage caused by voltage during use of an electrochemical device. This is presumed to enable enhancement of voltage resistance characteristics of the electrode.

<Water-Soluble Polymer>

The water-soluble polymer contained in the presently disclosed binder composition for an electrochemical device electrode includes a nitrile group-containing monomer unit and an ethylenically unsaturated carboxylic acid monomer unit, and has a weight-average molecular weight of not less than 1,000 and not more than 50,000. The water-soluble polymer is a component that disperses in the binder composition to improve solid content dispersing ability of the binder composition, and that also has an effect of increasing flexibility and voltage resistance of an electrode that is obtained when the binder is used in formation of an electrode mixed material layer.

[Chemical Composition of Water-Soluble Polymer]

The water-soluble polymer is required to include a nitrile group-containing monomer unit and an ethylenically unsaturated carboxylic acid monomer unit, and may optionally include other monomer units.

—Nitrile Group-Containing Monomer Unit—

Examples of nitrile group-containing monomers that can be used to form the nitrile group-containing monomer unit include α,β-ethylenically unsaturated nitrile monomers. Specifically, any α,β-ethylenically unsaturated compound that has a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these nitrile group-containing monomers, acrylonitrile and methacrylonitrile are preferable. By forming the nitrile group-containing monomer unit of the water-soluble polymer using a (meth)acrylonitrile monomer such as acrylonitrile or methacrylonitrile, it is possible to obtain a composition for an electrochemical device electrode having even better electrode active material dispersibility.

One of these nitrile group-containing monomers may be used individually, or two or more of these nitrile group-containing monomers may be used in combination.

The fractional content of the nitrile group-containing monomer unit included in the water-soluble polymer when the amount of all monomer units included in the water-soluble polymer is taken to be 100 mass % is preferably 20 mass % or more, and more preferably 30 mass % or more, and is preferably 80 mass % or less, and more preferably 70 mass % or less. When the fractional content of the nitrile group-containing monomer unit included in the water-soluble polymer is not less than any of the lower limits set forth above, flexibility of an obtained electrode can be further improved. Moreover, when the fractional content of the nitrile group-containing monomer unit included in the water-soluble polymer is not more than any of the upper limits set forth above, solid content dispersing ability of the binder composition can be further improved.

—Ethylenically Unsaturated Carboxylic Acid Monomer Unit—

Examples of ethylenically unsaturated carboxylic acid monomers that can be used to form the ethylenically unsaturated carboxylic acid monomer unit include ethylenically unsaturated monocarboxylic acids and ethylenically unsaturated dicarboxylic acids. Examples of ethylenically unsaturated monocarboxylic acids include acrylic acid, methacrylic acid, and crotonic acid. Examples of ethylenically unsaturated dicarboxylic acids include maleic acid, fumaric acid, and itaconic acid. Of these ethylenically unsaturated carboxylic acid monomers, ethylenically unsaturated dicarboxylic acids are preferable, itaconic acid and fumaric acid are more preferable, and itaconic acid is particularly preferable from a viewpoint of increasing solid content dispersing ability of the binder composition. One of these ethylenically unsaturated carboxylic acid monomers may be used individually, or two or more of these ethylenically unsaturated carboxylic acid monomers may be used in combination.

The fractional content of the ethylenically unsaturated carboxylic acid monomer unit included in the water-soluble polymer is preferably 20 mass % or more, and more preferably 30 mass % or more, and is preferably 80 mass % or less, more preferably 70 mass % or less, and even more preferably 60 mass % or less. When the fractional content of the ethylenically unsaturated carboxylic acid monomer unit in the water-soluble polymer is not less than any of the lower limits set forth above, solid content dispersing ability of the binder composition can be further improved. Moreover, when the fractional content of the ethylenically unsaturated carboxylic acid monomer unit in the water-soluble polymer is not more than any of the upper limits set forth above, excessive increase of the water content in an obtained electrode can be inhibited, and electrochemical characteristics such as output characteristics of an electrochemical device including the electrode can be enhanced.

—Other Monomer Units—

Examples of other monomer units include, but are not specifically limited to, a hydroxyl group-containing monomer unit and a (meth)acrylic acid ester monomer unit.

The fractional content of other monomer units included in the water-soluble polymer is preferably less than 10 mass %, more preferably less than 5 mass %, even more preferably less than 1 mass %, and particularly preferably 0 mass %.

Examples of hydroxyl group-containing monomers that can be used to form the hydroxyl group-containing monomer unit include 2-hydroxyethyl acrylate, 2-hydroxyethyl methacrylate, hydroxypropyl acrylate, hydroxypropyl methacrylate, hydroxybutyl acrylate, hydroxybutyl methacrylate, 3-chloro-2-hydroxypropyl methacrylate, di(ethylene glycol) maleate, di(ethylene glycol) itaconate, 2-hydroxyethyl maleate, bis(2-hydroxyethyl) maleate, and 2-hydroxyethyl methyl fumarate. One of these hydroxyl group-containing monomers may be used individually, or two or more of these hydroxyl group-containing monomers may be used in combination.

Examples of (meth)acrylic acid ester monomers that can be used to form the (meth)acrylic acid ester monomer unit include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, and 2-ethylhexyl acrylate; and methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, and 2-ethylhexyl methacrylate. One of these (meth)acrylic acid ester monomers may be used individually, or two or more of these (meth)acrylic acid ester monomers may be used in combination.

[Production Method of Water-Soluble Polymer]

The water-soluble polymer can be produced by performing polymerization of a monomer composition containing the monomers set forth above in an aqueous solvent such as water, for example. The fractional content of each monomer in the monomer composition in this polymerization can be set in accordance with the fractional content of each repeating unit (monomer unit) in the water-soluble polymer.

The polymerization method is not specifically limited, and any of solution polymerization, suspension polymerization, bulk polymerization, and emulsion polymerization may be used. Also, any polymerization reaction can be used, such as ionic polymerization, radical polymerization, or living radical polymerization.

Typically used additives such as emulsifiers, dispersants, polymerization initiators, and polymerization aids may be used in the polymerization. The amounts of these additives may also be the same as typically used. The polymerization conditions can be adjusted as appropriate depending on the polymerization method, the type of polymerization initiator, and so forth.

From a viewpoint of improving stability of the binder composition, it is preferable that after the polymerization reaction described above, the pH of an aqueous solution of the water-soluble polymer that is obtained is adjusted to not lower than 7 and not higher than 13. This pH adjustment can be carried out by a known method such as through addition of a pH adjuster.

[Properties of Water-Soluble Polymer]

—Weight-Average Molecular Weight—

The weight-average molecular weight of the water-soluble polymer is required to be not less than 1,000 and not more than 50,000. Moreover, the weight-average molecular weight of the water-soluble polymer is preferably 8,000 or more, and more preferably 15,000 or more, and is preferably 40,000 or less, and more preferably 30,000 or less. When the weight-average molecular weight of the water-soluble polymer is not less than any of the lower limits set forth above, solid content dispersing ability of the binder composition can be increased. Moreover, in a situation in which the binder composition is used to form an electrode, better coverage of an electrode active material by the water-soluble polymer in the electrode can be achieved when the weight-average molecular weight of the water-soluble polymer is not more than any of the upper limits set forth above. As a consequence, voltage resistance of the electrode can be increased.

Note that the weight-average molecular weight of the water-soluble polymer can be controlled by, for example, adjusting the polymerization time or adjusting the amount of various additives such as described above, and particularly of a polymerization aid such as a chain transfer agent, a polymerization initiator, or the like, without any specific limitations.

—Molecular Weight Distribution—

The molecular weight distribution of the water-soluble polymer is preferably 1.0 or more, and more preferably 1.1 or more, and is preferably 5.0 or less, and more preferably 3.0 or less. In the present specification, the term "molecular weight distribution" refers to a value expressed by the ratio of weight-average molecular weight (Mw) to number-average molecular weight (Mn). The value of the molecular weight distribution is calculated by measuring the weight-average molecular weight (Mw) and the number-average molecular weight (Mn) for the polymer by gel permeation chromatography and then calculating the molecular weight distribution (Mw/Mn). Specifically, the value of the molecular weight distribution can be obtained by determining the weight-average molecular weight (Mw) and the number-average molecular weight (Mn) of the polymer as standard sample-equivalent values using a gel permeation chromatograph, and then calculating the molecular weight distribution (Mw/Mn).

Note that the molecular weight distribution of the water-soluble polymer can be controlled by, for example, adjusting the polymerization time or adjusting the amount of various additives such as described above, and particularly of a polymerization aid such as a chain transfer agent, a polymerization initiator, or the like, without any specific limitations.

<Solvent>

The binder composition contains water as a solvent. The binder composition may also contain a small amount of a medium other than water (for example, an organic solvent) as a solvent.

<Particulate Polymer>

The binder composition may optionally contain a particulate polymer. The particulate polymer is a component that, in a situation in which the binder composition is used to form an electrode mixed material layer, can function as a binder in the electrode mixed material layer. The particulate polymer is normally water-insoluble and is present in a dispersed state in a dispersion medium such as water. The term "water-insoluble" as used with respect to a particulate polymer in the present disclosure means that when 0.5 g of the particulate polymer is dissolved in 100 g of water at a temperature of 25° C., insoluble content is 80 mass % or more.

The chemical composition of the particulate polymer is not specifically limited and may be adjusted as appropriate depending on the type of electrode (positive electrode or negative electrode) that the binder composition is to be used to form, for example. Suitable examples of the particulate polymer include a polymer including a conjugated diene monomer unit (conjugated diene polymer) such as a styrene-butadiene copolymer (SBR) and a polymer including a (meth)acrylic acid ester monomer unit (acrylic polymer). These particulate polymers may be one type used individually or a plurality of types used in combination.

[Conjugated Diene Polymer]

The conjugated diene polymer may, for example, be a polymer that includes an aromatic vinyl monomer unit and an aliphatic conjugated diene monomer unit, and that optionally includes other monomer units.

—Aromatic Vinyl Monomer Unit—

Examples of aromatic vinyl monomers that can be used to form the aromatic vinyl monomer unit include styrene, α-methylstyrene, vinyltoluene, and divinylbenzene. Of these aromatic vinyl monomers, styrene is preferable from a viewpoint of increasing mechanical strength of an obtained electrode. One of these aromatic vinyl monomers may be used individually, or two or more of these aromatic vinyl monomers may be used in combination.

The proportion in which the aromatic vinyl monomer unit is included in the particulate polymer when the amount of all monomer units is taken to be 100 mass % is preferably 50 mass % or more, and more preferably 60 mass % or more, and is preferably 80 mass % or less, and more preferably 70 mass % or less.

—Aliphatic Conjugated Diene Monomer Unit—

Examples of aliphatic conjugated diene monomers that can be used to form the aliphatic conjugated diene monomer unit include 1,3-butadiene, 2-methyl-1,3-butadiene, 2,3-dimethyl-1,3-butadiene, 2-chloro-1,3-butadiene, substituted linear conjugated pentadienes, and substituted and branched conjugated hexadienes. Of these aliphatic conjugated diene monomers, 1,3-butadiene is preferable. One of these aliphatic conjugated diene monomers may be used individually, or two or more of these aliphatic conjugated diene monomers may be used in combination.

The fractional content of the aliphatic conjugated diene monomer unit in the particulate polymer when the amount of all monomer units is taken to be 100 mass % is preferably 20 mass % or more, and more preferably 30 mass % or more, and is preferably 50 mass % or less, and more preferably 40 mass % or less.

—Other Monomer Units—

Examples of other monomers units include, but are not specifically limited to, an ethylenically unsaturated carboxylic acid monomer unit and a hydroxyl group-containing monomer unit. Examples of ethylenically unsaturated carboxylic acid monomers that can be used to form the ethylenically unsaturated carboxylic acid monomer unit include the same ethylenically unsaturated carboxylic acid monomers as can be used to form the "ethylenically unsaturated carboxylic acid monomer unit" that can be included in the "water-soluble polymer". Examples of hydroxyl group-containing monomers that can be used to form the hydroxyl group-containing monomer unit include the same hydroxyl group-containing monomers as can be used to form "other monomer units" that can be included in the "water-soluble polymer". The fractional content of other monomer units that can be included in a styrene-butadiene copolymer when all monomer units are taken to be 100 mass % is preferably 10 mass % or less, and more preferably 5 mass % or less.

[Acrylic Polymer]

The acrylic polymer may, for example, be a polymer that includes a (meth)acrylic acid ester monomer unit, a nitrile group-containing monomer unit, and an ethylenically unsaturated carboxylic acid monomer unit, and that optionally includes other monomer units.

—(Meth)Acrylic Acid Ester Monomer Unit—

Examples of (meth)acrylic acid ester monomers that can be used to form the (meth)acrylic acid ester monomer unit include the same monomers given as examples of (meth)acrylic acid ester monomers that can be used to form other monomer units included in the water-soluble polymer.

The proportion in which the (meth)acrylic acid ester monomer unit is included in the particulate polymer when the amount of all monomer units is taken to be 100 mass % is preferably 35 mass % or more, more preferably 40 mass % or more, and even more preferably 45 mass % or more, and is preferably 80 mass % or less, and more preferably 75 mass % or less.

—Nitrile Group-Containing Monomer Unit—

Examples of nitrile group-containing monomers that can be used to form the nitrile group-containing monomer unit include the same nitrile group-containing monomers as can be used to form the "nitrile group-containing monomer unit" that can be included in the "water-soluble polymer".

The proportion in which the nitrile group-containing monomer unit is included in the particulate polymer when the amount of all monomer units is taken to be 100 mass % is preferably 10 mass % or more, and more preferably 20 mass % or more, and is preferably 50 mass % or less, and more preferably 40 mass % or less.

—Ethylenically Unsaturated Carboxylic Acid Monomer Unit—

Examples of ethylenically unsaturated carboxylic acid monomers that can be used to form the ethylenically unsaturated carboxylic acid monomer unit include the same ethylenically unsaturated carboxylic acid monomers as can be used to form the "ethylenically unsaturated carboxylic acid monomer unit" that can be included in the "water-soluble polymer".

The proportion in which the ethylenically unsaturated carboxylic acid monomer unit is included in the particulate polymer when the amount of all monomer units is taken to be 100 mass % is preferably 1 mass % or more, and is preferably 10 mass % or less, and more preferably 5 mass % or less.

—Other Monomer Units—

Examples of monomer units other than the (meth)acrylic acid ester monomer unit, the nitrile group-containing monomer unit, and the ethylenically unsaturated carboxylic acid monomer unit that can be included in the particulate polymer include, but are not specifically limited to, a hydroxyl group-containing monomer unit.

Examples of hydroxyl group-containing monomers that can be used to form the hydroxyl group-containing monomer unit include the same hydroxyl group-containing monomers as can be used to form "other monomer units" that can be included in the "water-soluble polymer".

The fractional content of other monomer units in the particulate polymer when all monomer units are taken to be 100 mass % is preferably 5 mass % or less.

[Production Method of Particulate Polymer]

The particulate polymer can be produced by performing polymerization of a monomer composition containing the monomers set forth above in an aqueous solvent such as water, for example. The fractional content of each monomer in the monomer composition in this polymerization can be set in accordance with the fractional content of each repeating unit (monomer unit) in the particulate polymer.

The polymerization method is not specifically limited, and any of solution polymerization, suspension polymerization, bulk polymerization, and emulsion polymerization may be used. Also, any polymerization reaction can be used, such as ionic polymerization, radical polymerization, or living radical polymerization.

Typically used additives such as emulsifiers, dispersants, polymerization initiators, and polymerization aids may be used in the polymerization. The amounts of these additives may also be the same as typically used. The polymerization conditions can be adjusted as appropriate depending on the polymerization method, the type of polymerization initiator, and so forth.

In production of the particulate polymer, during the process of a polymerization reaction in which emulsion polymerization is adopted, the pH of the polymerization environment may be raised to 6 or higher at a timing at which the monomer conversion rate is within a range of 60% to 70%, for example, so as to efficiently obtain a particulate polymer dispersion liquid containing, in a solvent, a water-soluble polymer that satisfies the conditions described above in relation to chemical composition, weight-average molecular weight, and so forth. This method can increase the ratio of content of the water-soluble polymer relative to content of the particulate polymer. The pH of the polymerization environment can be raised through addition of a pH adjuster such as sodium hydroxide aqueous solution, for example, or through any other typical method.

In a case in which the water-soluble polymer is also synthesized during production of the particulate polymer (i.e., in a case in which the water-soluble polymer is synthesized as a by-product of particulate polymer synthesis), the chemical composition of the water-soluble polymer can be controlled by adjusting the concentration of monomers during polymerization. Moreover, in a case in which the water-soluble polymer is synthesized as a by-product, the weight-average molecular weight and molecular weight distribution of the water-soluble polymer can be controlled by adjusting the additive amount of polymerization initiator.

[Content Ratio of Water-Soluble Polymer and Particulate Polymer]

In a case in which the binder composition contains a particulate polymer, the content ratio of the water-soluble polymer in the binder composition when the content of the particulate polymer is taken to be 100 mass % is preferably 1.0 mass % or more, more preferably 1.5 mass % or more, and even more preferably 1.7 mass % or more, and is preferably 20 mass % or less, and more preferably 10 mass % or less. When the fractional content of the water-soluble polymer relative to the particulate polymer is not less than any of the lower limits set forth above, solid content dispersing ability of the binder composition can be improved. Moreover, when the fractional content of the water-soluble polymer relative to the particulate polymer is not more than any of the upper limits set forth above, excessive increase of water content in an electrode that can be formed using the binder composition can be inhibited, and electrochemical characteristics such as output characteristics of an electrochemical device including the electrode can be enhanced.

As previously described, the following three patterns are envisaged for the source of water-soluble polymer that can be contained in the binder composition.

(1) A case in which only water-soluble polymer produced by the method previously described in the "Production method of water-soluble polymer" section is contained in the binder composition (2) A case in which only water-soluble polymer synthesized as a by-product of a particulate polymer is contained in the binder composition (3) A case in which water-soluble polymer synthesized as a by-product of particulate polymer synthesis and water-soluble polymer produced by the previously described method are contained in the binder composition In each of the cases (1) to (3), it is preferable that the content ratio of the water-soluble polymer in the binder composition satisfies any of the preferred ranges set forth above. Also, with regards to the weight-average molecular weight and the molecular weight distribution of the water-soluble polymer, in each of the cases (1) to (3), it is preferable that all water-soluble polymer contained in the binder composition satisfies any of the preferred ranges set forth above in the "Properties of water-soluble polymer" section.

<Other Components>

The binder composition may contain other optional components besides the components described above. Commonly known examples of such other components can be used without any specific limitations so long as electrochemical reactions in an electrochemical device are not affected. These other components may be one type used individually or a plurality of types used in combination.

Examples of such other components include known additives such as thickeners, dispersants, leveling agents, antioxidants, defoamers, wetting agents, pH adjusters, and additives for electrolyte solution having a function of inhibiting electrolyte solution decomposition.

In particular, a water-soluble macromolecule other than the previously described water-soluble polymer can be used as a thickener. The weight-average molecular weight of this water-soluble macromolecule is preferably 100,000 or more. Specific examples of such macromolecules include natural macromolecules such as thickening polysaccharides, alginic acid, and starch; semi-synthetic macromolecules including water-soluble cellulose such as carboxymethyl cellulose (CMC); and synthetic macromolecules such as polyvinyl alcohol and polyvinyl acetate. Of these macromolecules, carboxymethyl cellulose is preferable from a viewpoint of providing the binder composition with good viscosity stability.

<Production of Binder Composition for Electrochemical Device Electrode>

No specific limitations are placed on the method by which the presently disclosed binder composition is produced. For example, the presently disclosed binder composition can be produced by mixing the components described above by a known method. In a case in which the water-soluble polymer is produced through polymerization of a monomer composition in an aqueous solvent, the binder composition may be produced by mixing the particulate polymer and other components with the aqueous solution of the water-soluble polymer.

(Composition for Electrochemical Device Electrode)

The presently disclosed composition for an electrochemical device electrode is an aqueous slurry composition that contains the previously described binder composition for an electrochemical device electrode and an electrode active material, and that optionally further contains other components. In other words, the presently disclosed composition for an electrode contains an electrode active material, the previously described water-soluble polymer, and water serving as a dispersion medium, and may optionally further contain other components.

The presently disclosed composition for an electrode has a high degree of dispersion of solid content as a result of containing the presently disclosed binder composition. Moreover, the presently disclosed composition for an electrode can be used to form an electrode for an electrochemical device having high flexibility and voltage resistance characteristics. Furthermore, the presently disclosed composition for an electrode can suitably be used in formation of a positive electrode for an electrochemical device.

<Electrode Active Material>

Any material known as an electrode active material for an electrochemical device can be used as the electrode active material. Also note that the electrode active material can be selected as appropriate depending on the type of electrochemical device. In a case in which the electrochemical device that is to be produced is a lithium ion secondary battery, for example, examples of positive electrode active materials that can be used in a positive electrode of the lithium ion secondary battery include metal oxides that enable reversible doping and dedoping of lithium ions. Examples of such oxidized metal material include lithium cobalt oxide, lithium nickel oxide, lithium manganate, lithium iron phosphate such as olivine-type lithium iron phosphate, lithium manganese phosphate, lithium vanadium phosphate, lithium iron vanadate, lithium nickel-manganese-cobalt oxide (hereinafter, also referred to as "NMC"), lithium nickel-cobalt oxide, lithium nickel-manganese oxide, lithium iron-manganese oxide, lithium iron-manganese-cobalt oxide, lithium iron silicate, lithium iron-manganese silicate, vanadium oxide, copper vanadate, niobium oxide, titanium sulfide, molybdenum oxide, and molybdenum sulfide. The examples of positive electrode active materials listed above may be used individually or a plurality thereof may be mixed and used as appropriate depending on the application. Further examples include polymers such as polyacetylene, poly-p-phenylene, and polyquinone. Of these examples, olivine-type lithium iron phosphate and NMC are preferable as a positive electrode active material in a case in which the electrochemical device that is to be produced is a lithium ion secondary battery from a viewpoint of increasing output and improving safety of the electrochemical device.

The fractional content of the water-soluble polymer in the composition for an electrode relative to 100 parts by mass of the electrode active material is normally 0.01 parts by mass or more, and preferably 0.05 parts by mass or more, and is normally 1 part by mass or less, and preferably 0.8 parts by mass or less.

Moreover, the fractional content of the particulate polymer in the composition for an electrode relative to 100 parts by mass of the electrode active material is normally 0.1 parts by mass or more, and preferably 0.5 parts by mass or more, and is normally 10 parts by mass or less, and preferably 8 parts by mass or less.

<Dispersion Medium>

The composition for an electrode contains water as a dispersion medium. The composition for an electrode may also contain a small amount of a medium other than water (for example, an organic solvent) as a dispersion medium. Water contained in the binder composition as a solvent can be used as the water serving as a dispersion medium in the composition for an electrode.

<Other Components>

The composition for an electrode may contain other optional components besides the components described above. Commonly known examples of such other components can be used without any specific limitations so long as electrochemical reactions in an electrochemical device are not affected. These other components may be one type used individually or a plurality of types used in combination.

Other optional components in the composition for an electrode may include any of those given as various additives that can be contained in the previously described binder composition.

<Production of Composition for Electrochemical Device Electrode>

The presently disclosed composition for an electrochemical device electrode can be obtained without any specific limitations by mixing the previously described binder composition, the electrode active material, and optional components that are used as necessary (for example, additional water as a dispersion medium and other components such as described above).

Although no specific limitations are placed on the mixing method and mixing order of the above-described components, the mixing is preferably performed using a disperser as a mixing device to efficiently disperse the components. The disperser is preferably a device that can homogeneously disperse and mix the components. Examples of dispersers that can be used include a ball mill, a sand mill, a pigment disperser, a grinding machine, an ultrasonic disperser, a homogenizer, and a planetary mixer.

(Electrode for Electrochemical Device)

The presently disclosed electrode for an electrochemical device includes a current collector and an electrode mixed material layer formed using the previously described composition for an electrochemical device electrode. The electrode mixed material layer can be formed by, for example, applying the previously described composition for an electrode onto the surface of a suitable current collector to form a coating film, and then drying the coating film that has been formed. In other words, the presently disclosed electrode for an electrochemical device includes a current collector and an electrode mixed material layer that is a dried product of the previously described composition for an electrochemical device electrode and that contains an electrode active material, a water-soluble polymer, and, optionally, a particulate polymer and additives.

The presently disclosed electrode for an electrochemical device has excellent flexibility and voltage resistance characteristics as a result of being formed using the previously described composition for an electrochemical device electrode. Therefore, an electrochemical device can be caused to display excellent electrochemical characteristics by using the presently disclosed electrode for an electrochemical device.

<Current Collector>

The current collector included in the presently disclosed electrode for an electrochemical device is not specifically limited and can be selected as appropriate depending on the type of electrochemical device. For example, a material having electrical conductivity and electrochemical durability may be used as the current collector. Specifically, the current collector may, for example, be made of a metal material such as iron, copper, aluminum, nickel, stainless steel, titanium, tantalum, gold, or platinum. One of these materials may be used individually, or two or more of these materials may be used in combination in a freely selected ratio.

<Electrode Mixed Material Layer>

The electrode mixed material layer is, for example, formed through a step of applying the composition for an electrode (application step) and a step of drying the applied composition for an electrode (drying step).

Known methods can be used as the method of application in the application step without any specific limitations. Specific examples of application methods that can be used include doctor blading, dip coating, reverse roll coating, direct roll coating, gravure coating, extrusion coating, and brush coating. During application, the composition for an electrode may be applied onto one side or both sides of the current collector. The thickness of a film of the composition for an electrode on the current collector after application but before drying may be set as appropriate in accordance with the thickness of the electrode mixed material layer to be obtained after drying.

The composition for an electrode that has been applied onto the current collector may be dried by any commonly known method in the drying step without any specific limitations. Examples of drying methods that can be used include drying by warm, hot, or low-humidity air; drying in a vacuum; and drying by irradiation with infrared light, an electron beam, or the like. By drying the composition for an electrode that has been applied onto the current collector in this manner, an electrode mixed material layer can be formed on the current collector, and an electrode including the current collector and the electrode mixed material layer can be obtained.

After the drying step, the electrode mixed material layer may be further subjected to a pressing process, such as mold pressing or roll pressing. The pressing process can improve close adherence between the electrode mixed material layer and the current collector.

(Electrochemical Device)

The presently disclosed electrochemical device includes the presently disclosed electrode for an electrochemical device set forth above. More specifically, the presently disclosed electrochemical device may, for example, be a lithium ion secondary battery or a lithium ion capacitor in which the electrode is used. Of these devices, a lithium ion secondary battery is preferable as the presently disclosed electrochemical device. The lithium ion secondary battery may, for example, include a positive electrode or negative electrode that is the electrode for an electrochemical device obtained as described above, a separator, and an electrolyte solution.

Although the following describes, as one example, a case in which the electrochemical device is a lithium ion secondary battery, the presently disclosed electrochemical device is not limited to the following example. A lithium ion secondary battery corresponding to the presently disclosed electrochemical device normally includes electrodes (positive electrode and negative electrode), an electrolyte solution, and a separator, wherein the presently disclosed electrode for an electrochemical device is used for at least one of the positive electrode and the negative electrode.

<Electrodes>

A known electrode can be used without any specific limitations as an electrode other than the previously described electrode for an electrochemical device that can be used in the lithium ion secondary battery corresponding to the presently disclosed electrochemical device. Specifically, an electrode obtained by forming an electrode mixed material layer on a current collector by a known production method may be used as an electrode other than the previously described electrode for an electrochemical device.

<Electrolyte Solution>

The electrolyte solution is normally an organic electrolyte solution obtained by dissolving a supporting electrolyte in an organic solvent. The supporting electrolyte of the lithium ion secondary battery may, for example, be a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable, and $LiPF_6$ is particularly preferable as these lithium salts readily dissolve in solvents and exhibit a high degree of dissociation. One electrolyte may be used individually, or two or more electrolytes may be used in combination in a freely selected ratio.

The organic solvent used in the electrolyte solution is not specifically limited so long as the supporting electrolyte can dissolve therein. Suitable examples of organic solvents that can be used include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region.

The concentration of the electrolyte in the electrolyte solution may be adjusted as appropriate. Furthermore, known additives may be added to the electrolyte solution.

<Separator>

The separator may be a separator such as described in JP 2012-204303 A, for example, but is not specifically limited thereto. Of these separators, a microporous membrane made of polyolefinic (polyethylene, polypropylene, polybutene, or polyvinyl chloride) resin is preferred since such a membrane can reduce the total thickness of the separator, which increases the ratio of electrode active material in the lithium ion secondary battery, and consequently increases the capacity per volume.

<Production Method of Lithium Ion Secondary Battery>

The lithium ion secondary battery, which is one type of the presently disclosed electrochemical device, may be produced by, for example, stacking the positive electrode and the negative electrode with the separator in-between, performing rolling, folding, or the like of the resultant stack as necessary in accordance with the battery shape to place the stack in a battery container, injecting the electrolyte solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion constituted by a monomer unit in the polymer that is formed through polymerization of a given monomer is normally, unless otherwise specified, the same as the ratio (charging ratio) of the given monomer among all monomers used in polymerization of the polymer.

In the examples and comparative examples, the following methods were used to measure and evaluate the weight-average molecular weight of a water-soluble polymer, the solid content dispersing ability of a binder composition, the voltage resistance of an electrode, the flexibility of an electrode, and the output characteristics of an electrochemical device.

<Weight-Average Molecular Weight of Water-Soluble Polymer>

(1) Examples 1 to 11 and 13, and Comparative Examples 1 and 2

An aqueous solution of a water-soluble polymer produced in each of Examples 1 to 11 and 13, and Comparative Examples 1 and 2 was diluted to 0.3 mass % using the following eluent to obtain a measurement sample. The obtained measurement sample was analyzed by gel permeation chromatography (GPC) under the following conditions to determine the weight-average molecular weight of the water-soluble polymer.
GPC apparatus (main body): Produced by Tosoh Corporation
Column: Guard column PWXL×1, GMPWXL×1, G2500PWXL1×1 (temperature 45° C.) produced by Tosoh Corporation
Eluent: 0.1 mol/L sodium nitrate ($NaNO_3$) aqueous solution
Flow rate: 0.5 mL/minute
Detector: Differential refractive index detector RI-201 produced by Showa Denko K. K.; sensitivity: 16
Standard material: Monodisperse polyethylene oxide (2) Example 12

A water dispersion of a particulate polymer obtained in Example 12 was filtered to remove solid content, and then the obtained filtrate was diluted to 0.3 mass % with the same eluent as in (1) to obtain a measurement sample. The obtained measurement sample was analyzed in the same way as in (1) to determine the weight-average molecular weight of a water-soluble polymer.

<Solid Content Dispersing Ability of Binder Composition>

The dispersibility of a slurry composition for a positive electrode produced in each example or comparative example was measured in accordance with JIS K 5600-2-5 using a grind gauge (groove depth: 0 μm to 100 μm). The dispersibility was evaluated in accordance with the following standard.

A smaller particle diameter measured as described above indicates that the slurry composition for a positive electrode has a higher degree of dispersion and that a binder composition contained in the slurry composition for a positive electrode has better solid content dispersing ability.
A: Particle diameter of less than 60 μm
B: Particle diameter of not less than 60 μm and less than 90 μm
C: Particle diameter of 90 μm or more <Voltage Resistance of Electrode>

The surface of an electrode produced in each example or comparative example was observed using a scanning electron microscope (S-3400N produced by Hitachi, Ltd.), and coverage of active material was evaluated. Note that a square image of 100 μm×100 μm was observed under observation conditions of ×2,000 magnification and an accelerating voltage of 15 kV. In addition, an energy dispersive X-ray analyzer (Quantax produced by Bruker Corporation) that was an accessory of the same scanning electron microscope was used to perform element mapping of nitrogen atoms and carbon atoms to prepare a mapping image for each therefor. This operation was performed five times by randomly selecting five locations on the electrode.

In the image, 10 particles were randomly selected from among positive electrode active material particles that had a long side and a short side of 10 μm or more and that had a surface that was 90% or more observable without overlapping of other particles.

In an element mapping positive electrode active material particle image selected as described above, the area of regions in which nitrogen was confirmed to be present was judged to be active material surface covered by water-soluble polymer. When this covered proportion is high, it indicates that voltage resistance is good.
A: Covered proportion of 50% or more
B: Covered proportion of not less than 30% and less than 50%
C: Covered proportion of less than 30%

<Flexibility of Electrode>

The flexibility of an electrode was evaluated based on the presence of fractures and cracks in a pre-roll pressing positive electrode web produced in each example or comparative example. Lower visibility of fractures and cracks indicates better positive electrode flexibility.
A: Not visible even at ×10 magnification
B: Visible at ×2 magnification <Output Characteristics>

A wound cell lithium ion secondary battery having a discharge capacity of 800 mAh that was produced in each example or comparative example was left at rest for 24 hours in a 25° C. environment. The lithium ion secondary battery was subsequently subjected to a charging operation for 5 hours at a charge rate of 0.1 C in a 25° C. environment, and the voltage V0 at that time was measured. Thereafter, the lithium ion secondary battery was subjected to a discharging operation at a discharge rate of 1 C in a −10° C. environment, and the voltage V1 at 15 seconds after the start of discharge was measured. The voltage change ΔV (=V0−V1) was calculated, and low-temperature output characteristics were evaluated by the following standard. A smaller value for the voltage change ΔV indicates better low-temperature output characteristics.
A: Voltage change ΔV of less than 350 mV
B: Voltage change ΔV of 350 mV or more Example 1

<Production of Water-Soluble Polymer>

A polymerization can was charged with 100 parts of deionized water, 6.6 parts of acrylonitrile as a nitrile group-containing monomer, 4.4 parts of itaconic acid as an ethylenically unsaturated carboxylic acid monomer, and 0.6 parts of ammonium persulfate as a polymerization initiator. These materials were heated to 70° C. and were stirred for 300 minutes (5 hours) at a temperature of 70° C. Once the monomer conversion rate reached 90% or more, cooling was performed to end the reaction. Thereafter, the pH was adjusted to 8.0 using 4% sodium hydroxide aqueous solution and unreacted monomer was removed by thermal-vacuum distillation to obtain an aqueous solution of a water-soluble polymer. The weight-average molecular weight of the water-soluble polymer was measured by the previously described method. The results are shown in Table 1.

<Production of Slurry Composition for Positive Electrode>

A planetary mixer equipped with a disper blade was charged with 100 parts of olivine-type lithium iron phosphate ($LiFePO_4$; produced by Formosa; product name: SFCM; volume-average particle diameter: 5 μm) as a positive electrode active material, 4.0 parts of acetylene black (produced by Denki Kagaku Kogyo Kabushiki Kaisha; product name: DENKA BLACK HS-100; volume-average particle diameter: 35 μm), which is one type of carbon black, as a conductive material, 1.0 parts in terms of solid content of carboxymethyl cellulose (produced by Daicel Corporation; product name: Daicel 2200; degree of etherification: 0.8 to 1.0) as a thickener, and an appropriate amount of water. These materials were mixed in the planetary mixer for 60 minutes at a temperature of 25° C.

The resultant mixed liquid was further mixed for 30 minutes in a Homo Mixer, 4.0 parts in terms of solid content of a water dispersion of styrene-butadiene copolymer (SBR) as a particulate polymer, 0.08 parts in terms of solid content of the water-soluble polymer produced as described above, and an appropriate amount of water were subsequently added, the solid content concentration was adjusted to 58%, and then 20 minutes of mixing was performed to obtain a dispersion liquid. The obtained dispersion liquid was subjected to a defoaming process under reduced pressure to obtain a slurry composition for a lithium ion secondary battery positive electrode corresponding to the presently disclosed composition for an electrochemical device electrode.

The obtained slurry composition for a positive electrode was used to measure and evaluate dispersibility.

<Production of Positive Electrode>

The slurry composition for a lithium ion secondary battery positive electrode obtained as described above was applied onto aluminum foil (thickness: 20 μm) serving as a current collector using a comma coater such as to attain a post-drying positive electrode mixed material layer thickness of approximately 70 μm. Next, the aluminum foil on which the slurry composition for a lithium ion secondary battery positive electrode had been applied was conveyed inside an oven for 2 minutes at a temperature of 60° C. and a speed of 0.5 m/minute, and was then conveyed inside an oven for 2 minutes at a temperature of 120° C. to perform heat treatment and thereby obtain a pre-roll pressing positive electrode web. The obtained positive electrode web was used to evaluate electrode flexibility by the previously described method. The results are shown in Table 1.

The obtained positive electrode web was then rolled by roll pressing to produce a positive electrode for a lithium ion secondary battery including a positive electrode mixed material layer of 60 μm in thickness.

The obtained positive electrode for a lithium ion secondary battery was used to evaluate voltage resistance by the previously described method. The results are shown in Table 1.

<Production of Negative Electrode>

A planetary mixer equipped with a disper blade was charged with 100 parts of artificial graphite (volume-average particle diameter: 24.5 μm; specific surface area: 4 $m^2$/g) as a negative electrode active material and 2.0 parts in terms of solid content of carboxymethyl cellulose (produced by Daicel Corporation; product name: Daicel 2200; degree of etherification: 0.8 to 1.0) as a thickener, an appropriate amount of deionized water was added, and these materials were mixed for 60 minutes at a temperature of 25° C. The solid content concentration was then adjusted to 52% with deionized water, and then a further 15 minutes of mixing was performed at a temperature of 25° C. to obtain a mixed liquid. A dispersion liquid was then obtained by adding 2 parts of a solution of styrene-butadiene copolymer (volume-average particle diameter: 140 nm; glass-transition temperature: 10° C.) having a solid content concentration of 40% and deionized water to the mixed liquid that was obtained, adjusting the final solid content concentration to 42%, and performing a further 10 minutes of mixing. The obtained dispersion liquid was subjected to a defoaming process under reduced pressure to obtain a slurry composition for a lithium ion secondary battery negative electrode.

Next, the obtained slurry composition for a lithium ion secondary battery negative electrode was applied onto copper foil (thickness: 20 μm) serving as a current collector using a comma coater such as to attain a post-drying negative electrode mixed material layer thickness of approximately 60 μm. Next, the copper foil on which the slurry composition for a lithium ion secondary battery positive electrode had been applied was conveyed inside an oven for 2 minutes at a temperature of 60° C. and a speed of 0.5 m/minute, and was then conveyed inside an oven for 2 minutes at a temperature of 120° C. to perform heat treatment and thereby obtain a pre-roll pressing negative electrode web.

The obtained negative electrode web was then rolled by roll pressing to produce a negative electrode for a lithium ion secondary battery including a negative electrode mixed material layer of 30 μm in thickness.

<Production of Lithium Ion Secondary Battery>

The positive electrode for a lithium ion secondary battery obtained as described above was cut out (width: 50 mm; length: 392 mm). A single-layer polypropylene separator (width: 65 mm; length: 500 mm; thickness: 25 μm; porosity: 55%) produced by a dry method was positioned on the surface at the positive electrode mixed material layer-side of the positive electrode. In addition, the negative electrode for a lithium ion secondary battery obtained as described above was cut out (width: 52 mm; length: 400 mm) and was positioned on the separator such that the surface at the negative electrode mixed material layer-side of the negative electrode faced the separator. The resultant laminate was wound using a winding machine to obtain a roll. The obtained roll was then enclosed in aluminum packing. Next, the aluminum packing was filled with a $LiPF_6$ solution of 1.0 M in concentration (solvent: mixed solvent of ethylene carbonate/ethyl methyl carbonate=3/7 (volume ratio); additive: 2 volume % (solvent ratio) of vinylene carbonate) as an electrolyte solution. An opening of the aluminum packing was sealed closed by heat sealing at a temperature of 150° C. to thereby produce a lithium ion secondary battery (electrochemical device) that was a wound cell having a discharge capacity of 800 mAh.

The obtained lithium ion secondary battery was used to evaluate output characteristics by the previously described method. The results are shown in Table 1.

Example 2

In production of a water-soluble polymer, the amount of polymerization initiator was set as 1.2 parts, and thus the weight-average molecular weight of the water-soluble polymer was as shown in Table 1. With the exception that this water-soluble polymer was used, a lithium ion secondary battery and so forth were produced and various measurements and evaluations were performed in the same way as in Example 1. The results are shown in Table 1.

Example 3

In production of a water-soluble polymer, the amount of polymerization initiator was set as 0.2 parts, and thus the weight-average molecular weight of the water-soluble polymer was as shown in Table 1. With the exception that this water-soluble polymer was used, a lithium ion secondary battery and so forth were produced and various measurements and evaluations were performed in the same way as in Example 1. The results are shown in Table 1.

Example 4

In production of a water-soluble polymer, the amounts of acrylonitrile and itaconic acid were changed as shown in Table 1. Moreover, the reaction time in production of the water-soluble polymer was changed to 3 hours. With the exception that the water-soluble polymer produced in this manner was used, a lithium ion secondary battery and so forth were produced and various measurements and evaluations were performed in the same way as in Example 1. The results are shown in Table 1.

Example 5

In production of a water-soluble polymer, the amounts of acrylonitrile and itaconic acid were changed as shown in Table 1. Moreover, the reaction time in production of the water-soluble polymer was changed to 8 hours. With the exception that the water-soluble polymer produced in this manner was used, a lithium ion secondary battery and so forth were produced and various measurements and evaluations were performed in the same way as in Example 1. The results are shown in Table 1.

Examples 6 and 7

A water-soluble polymer was produced in the same way as in Example 1 with the exception that methacrylonitrile was used instead of acrylonitrile (Example 6) or fumaric acid was used instead of itaconic acid (Example 7). With the exception that this water-soluble polymer was used, a lithium ion secondary battery and so forth were produced and various measurements and evaluations were performed in the same way as in Example 1. The results are shown in Table 1.

Examples 8 and 9

With the exception that the amount of water-soluble polymer in production of a slurry composition for a lithium ion secondary battery positive electrode was changed as shown in Table 1, a lithium ion secondary battery and so forth were produced and various measurements and evaluations were performed in the same way as in Example 1. The results are shown in Table 1.

Example 10

A particulate polymer that was an acrylic polymer (ACR1) produced as described below was used as a particulate polymer instead of the SBR used in Example 1. Also, in addition of this particulate polymer and a water-soluble polymer produced in the same way as in Example 1 in production of a slurry composition for a lithium ion secondary battery positive electrode corresponding to the presently disclosed composition for an electrochemical device electrode, the water-soluble polymer was added in an amount adjusted such that when the amount of the particulate polymer was taken to be 100 mass %, the total amount of the water-soluble polymer contained in the slurry composition was 2 mass %. With the exception of these points, a lithium ion secondary battery and so forth were produced and various measurements and evaluations were performed in the same way as in Example 1. The results are shown in Table 1.

<Production of Particulate Polymer (ACR1)>

A polymerization can A was charged with 83.7 parts of deionized water, 0.2 parts of sodium dodecyl diphenyl ether sulfonate as an emulsifier, and 1.0 parts of ammonium persulfate as a polymerization initiator. These materials were heated to 70° C. and were stirred for 30 minutes at a temperature of 70° C.

Next, a separate polymerization can B was charged with 75.0 parts of 2-ethylhexyl acrylate as a (meth)acrylic acid ester monomer, 22.0 parts of acrylonitrile as a nitrile group-containing monomer, 2.0 parts of itaconic acid as an ethylenically unsaturated carboxylic acid monomer, 1.0 parts by mass of 2-hydroxyethyl acrylate as a hydroxyl group-containing monomer (other monomer), 0.8 parts of sodium dodecyl diphenyl ether sulfonate as an emulsifier, and 74 parts of deionized water. These materials were stirred at a temperature of 25° C. to obtain an emulsion. The obtained emulsion was consecutively added to the polymerization can A from the polymerization can B over approximately 200 minutes. Thereafter, stirring was performed for approximately 180 minutes and once the monomer conversion rate reached 97% or more, cooling was performed to end the reaction. The pH was subsequently adjusted to 7.0 with 4% sodium hydroxide aqueous solution, and unreacted monomer was removed by thermal-vacuum distillation.

Example 11

A particulate polymer that was an acrylic polymer (ACR2) produced as described below was used as a particulate polymer instead of the SBR used in Example 1. Also, in addition of this particulate polymer and a water-soluble polymer produced in the same way as in Example 1 in production of a slurry composition for a lithium ion secondary battery positive electrode corresponding to the presently disclosed composition for an electrochemical device electrode, the water-soluble polymer was added in an amount adjusted such that when the amount of the particulate polymer was taken to be 100 mass %, the total amount of the water-soluble polymer contained in the slurry composition was 2 mass %. With the exception of these points, a lithium ion secondary battery and so forth were produced and various measurements and evaluations were performed in the same way as in Example 1. The results are shown in Table 1.

<Production of Particulate Polymer (ACR2)>

A polymerization can A was charged with 83.7 parts of deionized water, 0.2 parts of sodium dodecyl diphenyl ether sulfonate as an emulsifier, and 1.0 parts of ammonium persulfate as a polymerization initiator. These materials were heated to 70° C. and were stirred for 30 minutes at a temperature of 70° C.

Next, a separate polymerization can B was charged with 75.0 parts of 2-ethylhexyl acrylate as a (meth)acrylic acid ester monomer, 22.0 parts of acrylonitrile as a nitrile group-containing monomer, 3.0 parts of itaconic acid as an ethylenically unsaturated carboxylic acid monomer, 0.8 parts of sodium dodecyl diphenyl ether sulfonate as an emulsifier, and 74 parts of deionized water. These materials were stirred at a temperature of 25° C. to obtain an emulsion. The obtained emulsion was consecutively added to the polymerization can A from the polymerization can B over approximately 200 minutes. Thereafter, stirring was performed for approximately 180 minutes and once the monomer conversion rate reached 97% or more, cooling was performed to end the reaction. The pH was subsequently adjusted to 7.0 with 4% sodium hydroxide aqueous solution, and unreacted monomer was removed by thermal-vacuum distillation.

Example 12

The same acrylic polymer (ACR2) as in Example 11 was used as a particulate polymer. Moreover, a water-soluble polymer was not separately added in production of a slurry composition for a lithium ion secondary battery positive electrode corresponding to the presently disclosed composition for an electrochemical device electrode. In other words, the slurry composition for a positive electrode produced in the present example contained a water-soluble polymer produced as a by-product in production of the acrylic polymer (ACR2). With the exception of these points, a lithium ion secondary battery and so forth were produced and various measurements and evaluations were performed in the same way as in Example 1. The results are shown in Table 1.

Example 13

With the exception that lithium nickel-manganese-cobalt oxide (NMC) (produced by Umicore) was used as a positive electrode active material in production of a slurry composition for a positive electrode, a lithium ion secondary battery and so forth were produced and various measurements and evaluations were performed in the same way as in Example 1. The results are shown in Table 1.

Comparative Example 1

In production of a water-soluble polymer, the amount of polymerization initiator was set as 1.8 parts, and thus the weight-average molecular weight of the water-soluble polymer was as shown in Table 1. With the exception that this water-soluble polymer was used, a lithium ion secondary battery and so forth were produced and various measurements and evaluations were performed in the same way as in Example 1. The results are shown in Table 1.

Comparative Example 2

In production of a water-soluble polymer, the amount of polymerization initiator was set as 0.07 parts, the reaction time was changed to 8 hours, and thus the weight-average molecular weight of the water-soluble polymer was as shown in Table 1. With the exception that this water-soluble polymer was used, a lithium ion secondary battery and so forth were produced and various measurements and evaluations were performed in the same way as in Example 1. The results are shown in Table 1.

In Table 1, shown below:
"ST" indicates styrene unit;
"BD" indicates 1,3-butadiene unit;
"IA" indicates itaconic acid unit;
"HEA" indicates 2-hydroxyethyl acrylate unit;
"2-EHA" indicates 2-ethylhexyl acrylate unit;
"AN" indicates acrylonitrile unit;
"LFP" indicates olivine-type lithium iron phosphate;
"CB" indicates carbon black;
"CMC" indicates carboxymethyl cellulose;
"SBR" indicates styrene-butadiene copolymer;
"FA" indicates fumaric acid unit;
"ACR" indicates acrylic polymer; and
"NMC" indicates lithium nickel-manganese-cobalt oxide.

TABLE 1

| | | | | Examples | | | | |
|---|---|---|---|---|---|---|---|---|
| | | | | 1 | 2 | 3 | 4 | 5 |
| Composition for electrode | Electrode active material | Type | | LFP | LFP | LFP | LFP | LFP |
| | | Additive amount (parts by mass) | | 100.0 | 100.0 | 100.0 | 100.0 | 100.0 |
| | Conductive material | Type | | CB | CB | CB | CB | CB |
| | | Additive amount (parts by mass) | | 4.0 | 4.0 | 4.0 | 4.0 | 4.0 |
| | Binder composition | Thickener | Type | CMC | CMC | CMC | CMC | CMC |
| | | | Additive amount (parts by mass) | 1.0 | 1.0 | 1.0 | 1.0 | 1.0 |
| | | Particulate polymer | Type | SBR | SBR | SBR | SBR | SBR |
| | | | Chemical composition (content) ST (mass %) | 63 | 63 | 63 | 63 | 63 |
| | | | BD (mass %) | 33 | 33 | 33 | 33 | 33 |
| | | | IA (mass %) | 3 | 3 | 3 | 3 | 3 |
| | | | HEA (mass %) | 1 | 1 | 1 | 1 | 1 |
| | | | 2-EHA (mass %) | — | — | — | — | — |
| | | | AN (mass %) | — | — | — | — | — |
| | | | Additive amount (parts by mass) | 4.0 | 4.0 | 4.0 | 4.0 | 4.0 |
| | | Water-soluble polymer | Chemical composition | AN/IA | AN/IA | AN/IA | AN/IA | AN/IA |
| | | | Weight-average molecular weight (—) | 20,000 | 1,500 | 45,000 | 20,000 | 20,000 |
| | | | Nitrile group-containing unit (mass %) | 60 | 60 | 60 | 75 | 25 |
| | | | Ethylenically unsaturated carboxylic acid unit (mass %) | 40 | 40 | 40 | 25 | 75 |
| | | | Fractional content (mass %) (relative to particulate polymer) | 2 | 2 | 2 | 2 | 2 |
| | | | Additive amount (parts by mass) | 0.08 | 0.08 | 0.08 | 0.08 | 0.08 |

TABLE 1-continued

| Evaluation | Solid content dispersing ability of binder composition | A | B | A | B | A |
| --- | --- | --- | --- | --- | --- | --- |
| | Voltage resistance of electrode | A | A | B | A | A |
| | Flexibility of electrode | A | A | A | A | B |
| | Output characteristics of secondary battery | A | A | A | A | B |

| | | | Examples | | | | |
| --- | --- | --- | --- | --- | --- | --- | --- |
| | | | 6 | 7 | 8 | 9 | 10 |
| Composition for electrode | Electrode active material | Type | LFP | LFP | LFP | LFP | LFP |
| | | Additive amount (parts by mass) | 100.0 | 100.0 | 100.0 | 100.0 | 100.0 |
| | Conductive material | Type | CB | CB | CB | CB | CB |
| | | Additive amount (parts by mass) | 4.0 | 4.0 | 4.0 | 4.0 | 4.0 |
| | Binder composition | Thickener Type | CMC | CMC | CMC | CMC | CMC |
| | | Additive amount (parts by mass) | 1.0 | 1.0 | 1.0 | 1.0 | 1.0 |
| | | Particulate polymer Type | SBR | SBR | SBR | SBR | ACR1 |
| | | Chemical composition (content) ST (mass %) | 63 | 63 | 63 | 63 | — |
| | | BD (mass %) | 33 | 33 | 33 | 33 | — |
| | | LA (mass %) | 3 | 3 | 3 | 3 | 2 |
| | | HEA (mass %) | 1 | 1 | 1 | 1 | 1 |
| | | 2-EHA (mass %) | — | — | — | — | 75 |
| | | AN (mass %) | — | — | — | — | 22 |
| | | Additive amount (parts by mass) | 4.0 | 4.0 | 4.0 | 4.0 | 4.0 |
| | | Water-soluble polymer Chemical composition | MAN/IA | AN/FA | AN/IA | AN/IA | AN/IA |
| | | Weight-average molecular weight (—) | 20,000 | 20,000 | 20,000 | 20,000 | 20,000 |
| | | Nitrile group-containing unit (mass %) | 60 | 60 | 60 | 60 | 60 |
| | | Ethylenically unsaturated carboxylic acid unit (mass %) | 40 | 40 | 40 | 40 | 40 |
| | | Fractional content (mass %) (relative to particulate polymer) | 2 | 2 | 1.5 | 18 | 2 |
| | | Additive amount (parts by mass) | 0.08 | 0.08 | 0.06 | 0.72 | 0.08 |
| Evaluation | Solid content dispersing ability of binder composition | | A | A | B | A | A |
| | Voltage resistance of electrode | | A | A | A | A | A |
| | Flexibility of electrode | | A | A | A | A | A |
| | Output characteristics of secondary battery | | A | A | A | B | A |

| | | | Examples | | | Comparative examples | |
| --- | --- | --- | --- | --- | --- | --- | --- |
| | | | 11 | 12 | 13 | 1 | 2 |
| Composition for electrode | Electrode active material | Type | LFP | LFP | NMC | LFP | LFP |
| | | Additive amount (parts by mass) | 100.0 | 100.0 | 100.0 | 100.0 | 100.0 |
| | Conductive material | Type | CB | CB | CB | CB | CB |
| | | Additive amount (parts by mass) | 4.0 | 4.0 | 2.0 | 4.0 | 4.0 |
| | Binder composition | Thickener Type | CMC | CMC | CMC | CMC | CMC |
| | | Additive amount (parts by mass) | 1.0 | 1.0 | 1.0 | 1.0 | 1.0 |
| | | Particulate polymer Type | ACR2 | ACR2 | SBR | SBR | SBR |
| | | Chemical composition (content) ST (mass %) | — | — | 63 | 63 | 63 |
| | | BD (mass %) | — | — | 33 | 33 | 33 |
| | | LA (mass %) | 3 | 3 | 3 | 3 | 3 |
| | | HEA (mass %) | — | — | 1 | 1 | 1 |
| | | 2-EHA (mass %) | 75 | 75 | — | — | — |
| | | AN (mass %) | 22 | 22 | — | — | — |
| | | Additive amount (parts by mass) | 4.0 | 4.0 | 4.0 | 4.0 | 4.0 |
| | | Water-soluble polymer Chemical composition | AN/IA | AN/IA | AN/IA | AN/IA | AN/IA |
| | | Weight-average molecular weight (—) | 20,000 | 20,000 | 20,000 | 500 | 100,000 |
| | | Nitrile group-containing unit (mass %) | 60 | 60 | 60 | 60 | 60 |
| | | Ethylenically unsaturated carboxylic acid unit (mass %) | 40 | 40 | 40 | 40 | 40 |
| | | Fractional content (mass %) (relative to particulate polymer) | 2 | 1 | 2 | 2 | 2 |
| | | Additive amount (parts by mass) | 0.08 | 0.04 | 0.08 | 0.08 | 0.08 |
| Evaluation | Solid content dispersing ability of binder composition | | A | B | A | C | A |
| | Voltage resistance of electrode | | A | A | A | A | C |
| | Flexibility of electrode | | A | A | A | A | B |
| | Output characteristics of secondary battery | | A | A | A | B | B |

It can be seen from Table 1 that a binder composition containing a water-soluble polymer that includes a nitrile group-containing monomer unit and an ethylenically unsaturated carboxylic acid monomer unit, and that has a weight-average molecular weight of not less than 1,000 and not more than 50,000 has excellent solid content dispersing ability and can form an electrode for an electrochemical device having high flexibility and voltage resistance characteristics. On the other hand, it can be seen that in Comparative Example 1 in which the molecular weight of a water-soluble polymer was less than 1,000, it was not possible to provide a binder composition with sufficiently high solid content dispersing ability, and it was not possible to sufficiently enhance output characteristics of an electrochemical device that was ultimately obtained. Moreover, it can be seen that in Comparative Example 2 in which the molecular weight of a water-soluble polymer was more than 50,000, it was not possible to sufficiently increase voltage resistance and flexibility of an electrode formed using a binder composition.

INDUSTRIAL APPLICABILITY

According to the present disclosure, it is possible to provide a binder composition for an electrochemical device electrode that has excellent solid content dispersing ability and can form an electrode for an electrochemical device having high flexibility and voltage resistance characteristics.

Moreover, according to the present disclosure, it is possible to provide a composition for an electrochemical device electrode that has a high degree of dispersion of solid content and can form an electrode for an electrochemical device having high flexibility and voltage resistance characteristics.

Furthermore, according to the present disclosure, it is possible to provide an electrode for an electrochemical device having high flexibility and voltage resistance characteristics, and also an electrochemical device that includes this electrode.

The invention claimed is:

1. A binder composition for an electrochemical device electrode comprising a water-soluble polymer and water, wherein
the water-soluble polymer includes a nitrile group-containing monomer unit, an ethylenically unsaturated carboxylic acid monomer unit, and less than 10 mass % of other monomer units,
the water-soluble polymer has a weight-average molecular weight of not less than 1,000 and not more than 50,000.

2. The binder composition for an electrochemical device electrode according to claim 1, wherein fractional content of the nitrile group-containing monomer unit in the water-soluble polymer is not less than 20 mass % and not more than 80 mass %.

3. The binder composition for an electrochemical device electrode according to claim 1, wherein fractional content of the ethylenically unsaturated carboxylic acid monomer unit in the water-soluble polymer is not less than 20 mass % and not more than 80 mass %.

4. The binder composition for an electrochemical device electrode according to claim 1, wherein the nitrile group-containing monomer unit is a (meth)acrylonitrile unit.

5. The binder composition for an electrochemical device electrode according to claim 1, wherein the ethylenically unsaturated carboxylic acid monomer unit is an ethylenically unsaturated dicarboxylic acid monomer unit.

6. The binder composition for an electrochemical device electrode according to claim 1, further comprising a particulate polymer.

7. The binder composition for an electrochemical device electrode according to claim 6, wherein fractional content of the water-soluble polymer is not less than 1.0 mass % and not more than 20 mass % relative to 100 mass % of the particulate polymer.

8. A composition for an electrochemical device electrode comprising:
the binder composition for an electrochemical device electrode according to claim 1; and
an electrode active material.

9. An electrode for an electrochemical device comprising:
a current collector; and
an electrode mixed material layer formed using the composition for an electrochemical device electrode according to claim 8.

10. An electrochemical device comprising the electrode for an electrochemical device according to claim 9.

* * * * *